United States Patent [19]

Nicholas

[11] Patent Number: 4,666,350
[45] Date of Patent: May 19, 1987

[54] BORING BAR

[76] Inventor: Leo P. Nicholas, 2290 Nixon, Howell, Mich. 48843

[21] Appl. No.: 573,420

[22] Filed: Jan. 24, 1984

[51] Int. Cl.$^4$ .............................................. B23B 41/14
[52] U.S. Cl. ..................................... 408/82; 408/83; 408/708
[58] Field of Search ....................... 408/81, 82, 83, 54, 408/129, 135, 708

[56] References Cited

U.S. PATENT DOCUMENTS 2,334,795  11/1943  Smith ..................................... 408/83
2,747,948  5/1956   Jergens ............................. 408/82 X
3,348,434  10/1967  Plummer ................................ 408/83

*Primary Examiner*—Z. R. Bilinsky
*Attorney, Agent, or Firm*—Cullen, Sloman, Cantor, Grauer, Scott & Rutherford

[57] ABSTRACT

An improved boring bar for machining bearings in an engine block or the like includes a plurality of circumferentially spaced wear pads which extend radially beyond the surface of the bar and form the sole points of support between the bar and the inner race of a bearing in which the bar is slideably received. Preferably, at least two of the wear pads are radially displaceable within slots on opposite circumferential sides of longitudinally aligned cutting tools which are secured to the bar. The pads are removably mounted in the slots within the bar by screws to allow rapid replacement of the pads due to wear. A thin layer of resilient material, such as neoprene rubber, is captured between the radially displaceable pads and the bottom of the slot, and urge the pads away from the bar, thereby biasing the bar in a direction away from the cutting tools and toward one side of the inner race of the bearing. The constant lateral biasing of the bar eliminates tool chatter and improves machining accuracy. Existing bars may be retrofitted with the wear pads. The bar may be made of soft steel so as to flex rather than break or crack when subjected to extraordinary bending forces.

45 Claims, 9 Drawing Figures

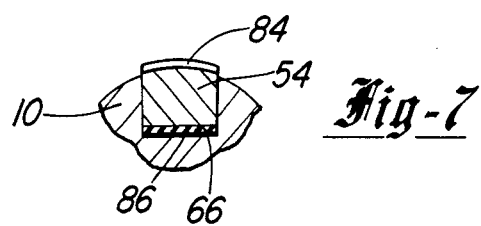
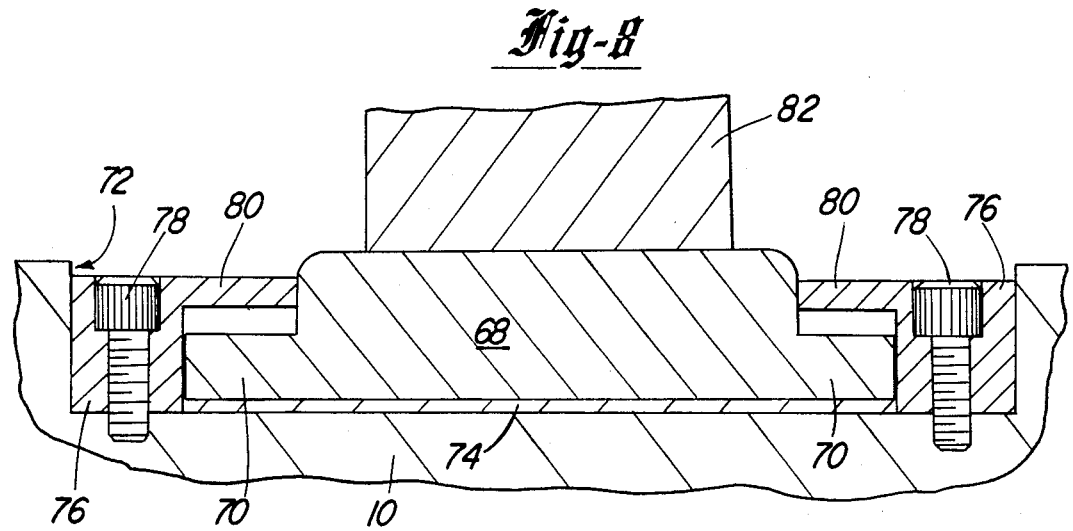
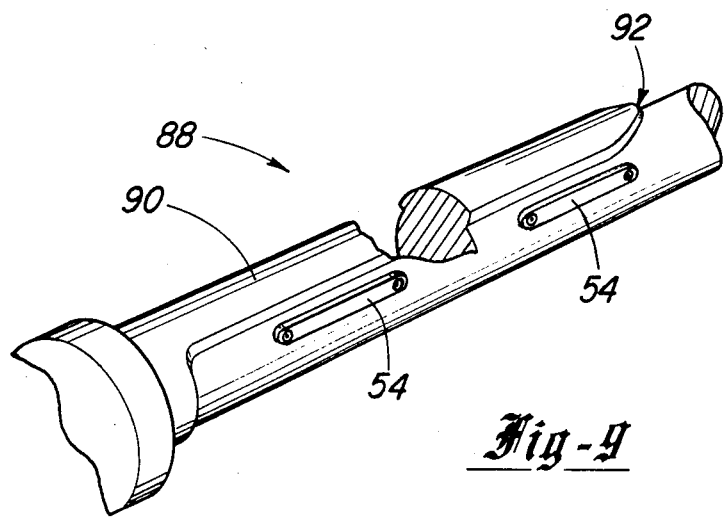

BORING BAR

TECHNICAL FIELD

The present invention broadly relates to boring bars employed in machining operations, and deals more particularly with a construction for mounting the bar within one or more bearing assemblies in which the bar is slideably received.

BACKGROUND ART

Boring bars are employed in certain machining operations where it is necessary to machine material in various locations along a common axis, i.e., the rotational axis of the bar. The bar includes a plurality of cutting tools that form a portion of cutting tool cartridges which are removably installed in longitudinal alignment along one side of the bar. The bar is mounted in a machine which rotates the bar about its longitudinal axis, and in some cases, the machine is also capable of displacing the bar along its axis.

One typical application of a boring bar (also sometimes referred to in the art as a "line bar") involves machining the bearings in a block of an internal combustion engine after it has been cast. The block is conveyed along a line to a transfer machine which includes a boring bar which is supported at its opposite ends by bearing assemblies to prevent deflection of the bar during machining operations. With an engine block in place at the machining station, the bar is displaced longitudinally from a standby position to a machining position within the block where the bar is slideably received and supported within support bearings. The engine block bearings are then machined by displacing the block and the rotating boring bar relative to each other. After the cutting operation is complete, the bar slides out of the support bearings and block, back to its standby position to permit transfer of the block to the next machining station. In the case of engine blocks, the blocks may be sucessively transferrred along the line between several identical machining stations with similar boring bars to effect several rough and finish cuts on the block bearings before maching of such bearings is finally complete.

Machining operations using boring bars as described above are performed on various other parts and workpieces, such as transmission housings and the like. The sliding frictional engagement between the support bearings and the outer surfaces of the bar produced during longitudinal displacement of the bar relative to the support bearings results in wear of the surfaces of both the bar and the inner races of the support bearings. Wear is increased by small shavings or chips of machined material which can become trapped between the bar and the inner race; this foreign material causes scoring of the bar and race surfaces when the bar is slid in and out of the race. This problem can become especially pronounced where significant clearance exists between the surface of the bar and inner race. Bar and bearing wear is particularly severe in production line environments where high volume machining requirements are experienced. Bar and bearing wear increases the clearance between the bar and inner races of the support bearings; as this clearance increases, the machining accuracy of the bar diminishes until it becomes necessary to replace the bar and/or bearings. Because boring bars and support bearings are relatively expensive, they are normally "reworked" rather than discarded. Reworking a bar or bearing involves plating the worn surfaces with chrome or the like in order to build these surfaces up to their original dimensions. Reworking is not only expensive in terms of the plating process required to build up the surface, but is also costly in terms of the down-time of the assembly line resulting from change over of the bars.

Another problem associated with prior art boring bars is that of "tool chatter" in which the bar vibrates within the support bearings. Tool chatter results from the fact that excessive clearance between the bar and inner race of the support bearing allows the bar to shift within the inner race at a harmonic frequency which creates vibration. Chatter not only reduces machining accuracy but also increases wear of the bar and bearing surfaces and sets up stresses which can damage either the bar or support bearing.

In the past, boring bars have been made of realtively hard steel, such as 8620 type heat treated steel which may have a hardness of 60 or more as measured on a Rockwell hardness tester. A hard steel is employed in order to reduce wear and/or permit the bars to be plated with a wear-resistant material such as chromium. Chromium plating increases the bar's hardness and stiffness but was desirable because it reduced the surface wear between the bar and support bearings and also allowed worn bars to be replated during rework thereof as previously discussed. Bars constructed of hard steel, especially those which are chrome plated, are brittle and cannot bend or flex to a significant extent without cracking or breaking.

In production line machining operations, severe bending stresses may be created in a bar as a result of inaccurate timing of the longitudinal advancement of the bar relative to the movement of the engine block along the conveyer line; if the bar is advanced prematurely, it may engage a solid part of the block rather than passing through the block, or if the bar is advanced to its machining operation before the next-to-be-machined block has reached the machining station, the bar is disposed within the path of the traveling block and eventually collides with the block. Either of these two eventualities results in extraordinary stresses being applied to the bar which usually cause the bar to crack or break, thus necessitating replacement of the bar and concomitant stopping of the production line to permit change-over of the bars. These same type of bar failures can also result from even slight misalignment between the displacement path of the bar and the position of the support bearing in which the bar is received.

In addition to the problem of bar damage, the extraordinary stresses which result in breaking of the bar pose a serious threat of injury to personnel. These high stresses can propel a broken bar with great force away from the machining station and into the surrounding environment.

Prior art bars are provided with elongate keys which are received within keyways in the inner races of the support bearings. These keys prevent turning of the bar within the inner race; thus, the bar and inner race of the bearing rotate as a unit. The keys normally consist of a plurality of longitudinally spaced, longitudinally aligned, individual key sections which are secured to the bar by screws to permit removal of the keys so that the bar can be machined and plated during rework thereof. The key sections must be individually machined and fitted within machined slots in the bar; this is a labor intensive operation and is therefore costly from a manufacturing standpoint. Additionally, the key sections often become loose from the bar and must be periodically tightened, thus resulting in "down-time" of the production line. In some cases, loose key sections may interefere with proper sliding movement of the bar into the bearing supports which causes binding or jamming that can set up damaging stresses in the bar as previously discussed.

SUMMARY OF THE INVENTION

According to the present invention, an improved boring bar construction is provided of the type in which a plurality of spaced cutting tools are aligned along a common longitudinal axis on one side of the bar. The bar is adapted to be rotatably supported in one or more bearings in which the bar is slideably received within the bearings' inner races. The bar may be provided with one or more longitudinally extending keys which are received within keyways in the inner races to prevent rotation of the bar relative to the race. A first pair of wear pads are mounted on the bar on opposite circumferential sides of the cutting tool axis and a second pair of wear pads are mounted on the other side of the bar. The wear pads extend radially beyond the outer surface of the bar and support the bar within the inner race of the bearing. Preferably, the first pair of pads are slightly radially displaceable whereas the second pair of pads are stationarily secured to the bar. A thin layer of resilient material, such as neoprene rubber, is captured between the bar and the first pair of pads and functions to bias the bar within the inner race in a radial direction away from the cutting tools, thereby loading the second pair of pads into firm engagement with the inner race. The side or lateral loading of the bar within the race prevents tool chatter and increases machining accuracy since the bar is maintained in a fixed position relative to the inner race during machining operations. Wear of the bar due to longitudinal sliding in and out of the support bearings is limited to the wear pads, however, the wear on the pads as well as wear on the inner race of the bearings is automatically compensated for by side loading produced by the biasing action of the pads. The wear pads are removably mounted in slots in the bar to allow rapid replacement of the pads due to wear. An alternate embodiment of the invention provides a means of removably mounting the wear pads without the need for machining holes through the pads.

The pads may be employed without the use of the layer of resilient material, in which case metal shims may be installed between the pads and the bar in order to compensate for the wear on the pads and/or bearings and thereby maintain the axis of the bar generally fixed relative to the inner races of the bearings.

The bar need not be manufactured of particularly hard steel and also need not be plated since the outer surfaces of the bar do not frictionally engage the support bearings. Consequently the bar may be made of steel which is less hard and brittle and which therefore may flex somewhat in response to bending stresses applied thereto, without breaking or cracking.

Existing, prior art boring bars may be adapted to employ the wear pads of the present invention according to a novel method of reworking such bars.

Accordingly, it is a primary object of the present invention to provide an improved boring bar which eliminates the problems attendant to wear of both the bearing and the bar surfaces due to sliding frictional engagement between the bar and a bearing in which the bar is slideably received.

A further object of the present invention is to provide an improved boring bar of the type described above having wear pads to absorb the wear produced by longitudinal sliding friction between the bar and bearing.

Another object of the invention is to provide a boring bar as described above which includes circumferentially spaced, replaceable wear pads which substantially form the sole points of bearing contact between the bar and the inner race of a bearing, thereby limiting wear to the pads and eliminating the need to periodically build up worn surfaces on the bar or the bearing by plating techniques or the like.

A further object of the present invention is to provide a boring bar as described above which eliminates tool chatter, and the machining error and problems of wear attendant thereto.

Another object of the invention is to provide an improved boring bar of the type mentioned above wherein the bar is laterally loaded into contact with one side of the bearing to reduce chatter and automatically stabilize the position of the bar relative to the bearing in order to achieve repeatable machining accuracy.

Another object of the present invention is to provide an improved boring bar as described above in which the wear pads may be quickly replaced when they become worn.

A still further object of the invention is to provide a boring bar as described above which prevents material chips and the like from becoming lodged between the bearing and the surface of the bar.

Another object of the invention is to provide an improved boring bar as mentioned above in which the radial position of at least some of the wear pads may be adjusted in order to center the longitudinal axis of the bar within the inner race of the bearing.

A still further object of the present invention is to provide a boring bar of the type which is keyed to an inner bearing race, wherein the key is formed integral with the bar and therefore does not require adjustment or periodic tightening.

Another object of the invention is to provide a boring bar construction generally as described above in which the bar is sufficiently flexible to preclude cracking or breaking when subjected to extraordinary bending forces.

A further object of the invention is to provide a method of adapting existing boring bars to employ various features of the invention discussed above.

These, and further objects of the invention, will be made clear, or will become apparent during the course of a detailed description of the invention set out hereinbelow.

BRIEF DESCRIPTION OF THE DRAWINGS

In the drawings, which form an integral part of the specification and are to be read in conjunction therewith, and in which like reference numerals are employed to designate identical components in the various views:

FIG. 7 is a sectional view taken along the line 7—7 in FIG. 5;

FIG. 8 is a longitudinal sectional view of an alternate form of wear pad construction; and, FIG. 9 is a perspective view of an improved boring bar which forms another embodiment of the present invention.

BEST MODE FOR CARRYING OUT THE INVENTION

Figure 1:
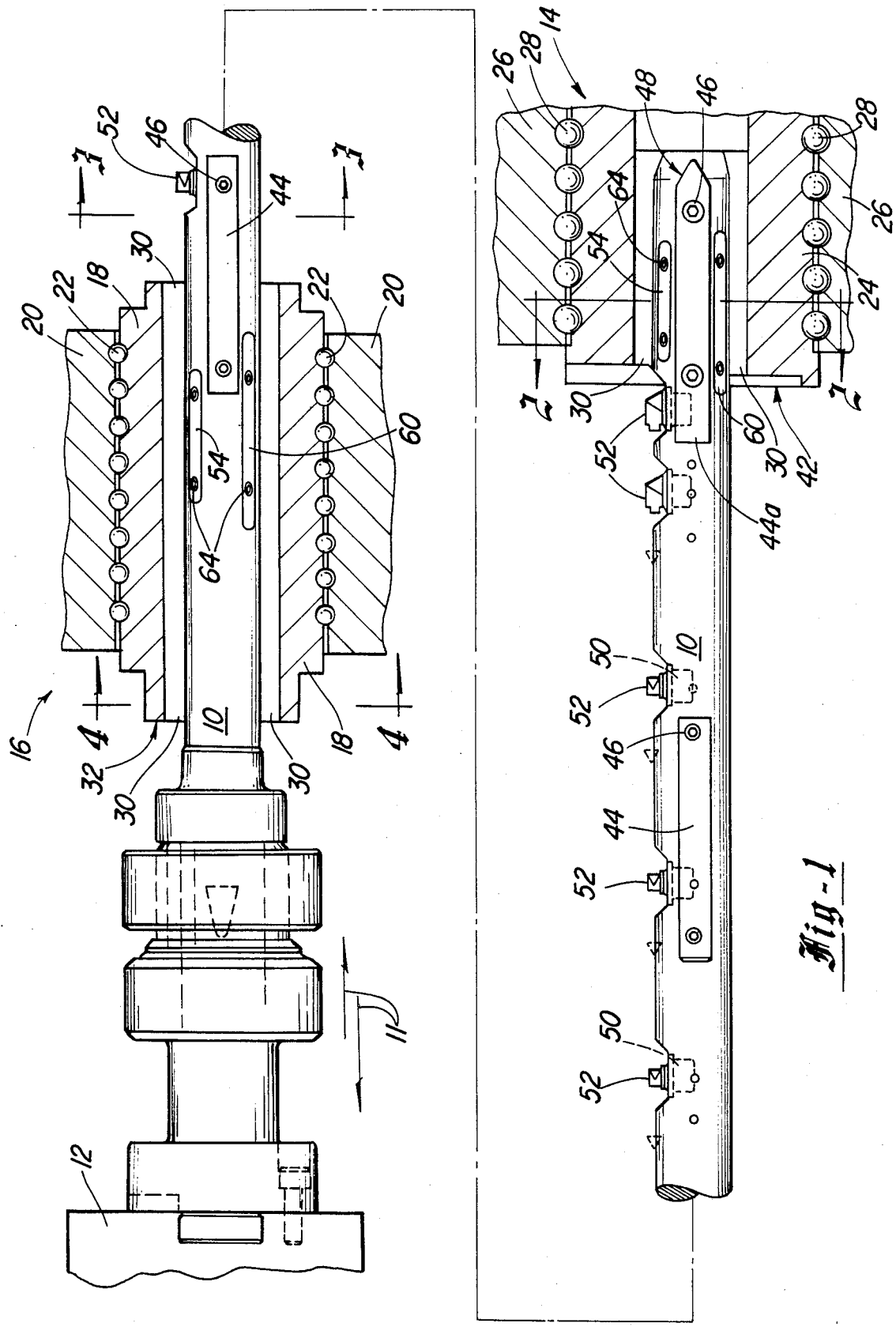
FIG. 1 is a side elevational view of an improved boring bar which forms one embodiment of the present invention, portions of two support bearings being broken away in cross section, the bar being shown in its fully extended machining position received within the support bearings.

Referring first to FIGS. 1-7, the present invention consists of an improved boring bar including a cylindrically shaped, solid bar 10 which is mounted on machine 12 that rotates the bar about its longitudinal axis. The machine 12 is of conventional, known design and may include means for displacing the bar along its longitudinal axis, toward and away from a workpiece (not shown) in the direction of arrows 11.

The bar 10 is slideably received within front and rear support bearings 14 and 16 respectively when the bar is axially displaced from a standby position to a machining position. With the bar 10 in the standby position, the workpiece (engine block, etc.) may be transferred by conveying the apparatus (not shown) to a predetermined position adjacent the machine 12 in preparation for a machining operation using the boring bar 10. With the workpiece properly positioned, the machine 12 displaces the bar 10 axially from its standby position to an extended, machining position within, or adjacent to, the workpiece. Rotation of the bar is then commenced and the workpiece and the bar are displaced relative to each other in order to "feed" the workpiece and effect cutting thereof. Following the machining operation, the rotation of the bar 10 is terminated and the bar 10 is axially returned to its standby position, following which the workpiece is transferred away (usually in a direction normal to the axis of the bar 10) to another machining station.

Support bearing assemblies 14 and 16 support the opposite extremities of the bar 10 in order to prevent deflection of the bar 10 during the machining operation. More or less than two support bearing assemblies may be required depending upon the length of the bar 10.

Support bearing assembly 16 includes an inner race 18 which is rotatable within an outer race 20 by means of ball bearings 22. Similarly, bearing assembly 14 includes an inner race 24 which is rotatable within an outer race 26 by means of ball bearings 28. Each of the inner races 18, 24 includes four, longitudinally extending, through-passageways or keyways 30 in the inner surface thereof. Keyways 30 are circumferentially spaced from each other at 90 degree intervals. The keyways 30 interrupt the inner surfaces of races 18, 24 to define four circumferentially spaced, individual bearing surface segments 82 which bear against and support the bar 10 within the corresponding race 18, 24.

The end face 32 of inner race 18 includes opposing, inwardly beveled pairs of surfaces 34-40 on opposite sides of the keyways 30. The adjacent, beveled surfaces 34-40 form tapered guides leading to the keyways 30 for purposes which will become later apparent. The end face of inner race 24 is provided with similar beveled surfaces which form tapered guides.

Figure 2:
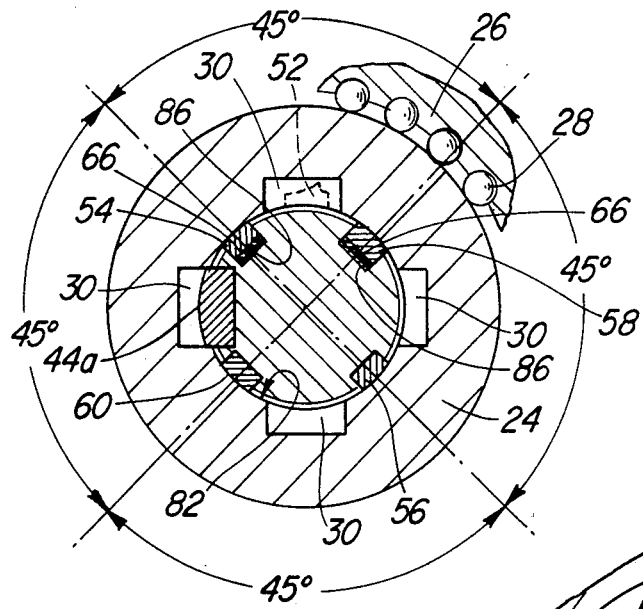
FIG. 2 is a sectional view taken along the line 2—2 in FIG. 1.
Figure 4:
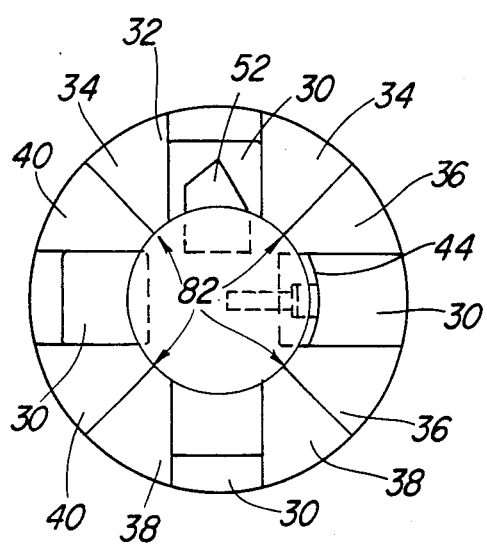
FIG. 4 is a sectional view taken along the line 4—4 in FIG. 1.
Figure 3:
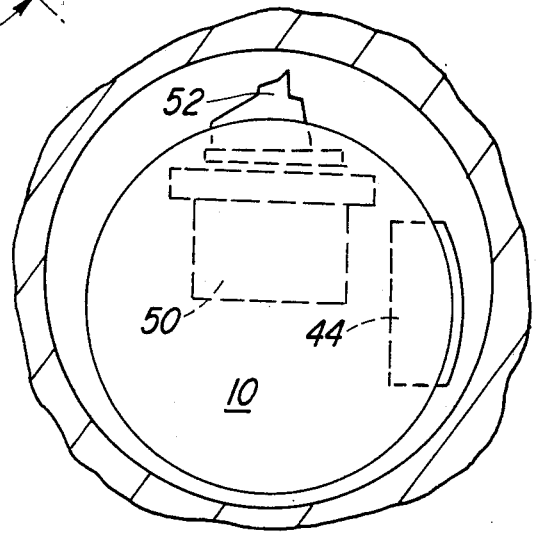
FIG. 3 is a sectional view taken along the line 3—3 in FIG. 1, the broken line indicating the surface of a part which is to be machined.

The bar 10 is preferably made of pre-heat treated soft steel such as flexor steel which deflects when subjected to bending stresses without cracking or breaking. The bar preferably possesses a hardness of 28 to 32 as measured on a Rockwell hardness tester. However, as will be discussed below, the invention is well adapted to be employed with bars of harder steel as well. In any event, the bar 10 is machined such that the diameter thereof is less than that of the bearing surfaces of the inner races 18, 24. The bar 10 is provided with a longitudinally extending key defined by a plurality of longitudinally aligned, spaced apart key sections 44 which are received within pockets in the surface of the bar 10. The key sections are removably secured to the bar by machine screws 46. The outer surface of key sections 44 possesses a curvature similar to that of the cylindrical surface of bar 10 and extends radially outward beyond the surface of bar 10, as best seen in FIGS. 2-4. The key section 44a at the outer end of bar 10 is provided with a V-shaped end 48 which is adapted to be slideably received within the tapered guides defined by the beveled surfaces 38-40 of the inner races 18, 24. Key sections 44 are longitudinally spaced such that at least one of them is received within a keyway 30 of each of the inner races 18, 24 when the bar is in its extended machining position. The key sections 44 function to rotatably index the inner races 18, 24 and prevent rotation of the bar 10 within the inner races 18, 24. It is to be noted, however, that other key arrangements may be employed to key the races 18, 24 to the bar 10; for example, the key could be carried by the races and the bar 10 may be provided with keyways for receiving the key.

A plurality of tool cartridges 50 are removably secured, by any suitable means, within openings in the bar 10. The cartridges 50 are aligned along a common axis on one side of the bar 10 and are angularly spaced 90 degrees from key sections 44. A cutting tool 52 in each of the cartridges 50 extends radially outward beyond the outer cylindrical surface of the bar 10. Keyways 30 permit passage of the cutting tool through the inner races 18, 24 when the bar 10 slides into and out of the bearing assemblies 14, 16.

The forward end of bar 10 is provided with a first pair of longitudinally extending wear pads 54 which extend radially through the surface of bar 10 and into engagement with the bearing surface segments 82 of the inner race 24. Wear pads 54 are disposed upon opposite circumferential sides of the common axis of cutting tools 52 and are circumferentially spaced from such axis approximately 45 degrees. The forward end of the bar 10 is also provided with a second pair of longitudinally extending wear pads 56 which are disposed respectively opposite wear pads 54 and are also adapted to engage the bearing segments 82 of the inner race 24. Thus, as seen in FIG. 2, the pads 54, 56 are angularly offset 90 degrees from each other about the longitudinal axis of bar 10. Equivalent constructions may employ different angular offsets and a different number of the wear pads, depending on the number of keyways 30 which are employed and the angular relationship between the keyways 30 and the cutting tools 52.

Similarly, first and second pairs of wear pads 58, 60 are mounted on the bar 10 in registered engagement with bearing surface segments 82 of the inner race 18 of bearing assembly 16. The pads 58 and 60 are identical in construction and angular placement to pads 54 and 56 associated with the forward end of the bar 10. The pads 54–60 extend radially outward beyond the surface of the bar 10 into engagement with the bearing surface segments 82 and thus form the sole points of support for the bar 10 within the inner races 18 and 24. It should be noted here that the key sections 44 are dimensioned so as to be closely received within any of the keyways 30, but sufficient clearance exists therebetween such that the key sections 44 do not substantially support the bar 10 within the inner races 18, 24. In other words, although the key sections 44 may engage the inner races 18, 24, the bar 10 is primarily supported within the inner races 18, 24 by the wear pads 56–60.

Figure 5:
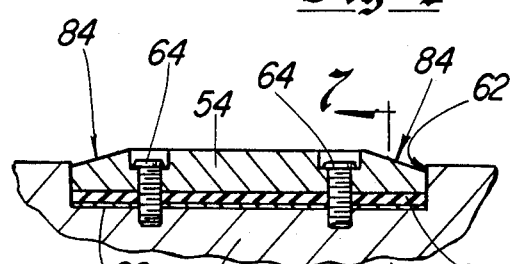
FIG. 5 is a fragmentary, sectional view of a portion of the bar shown in FIG. 1 and depicting one of the radially displaceable wear pads in longitudinal section.
Figure 6:
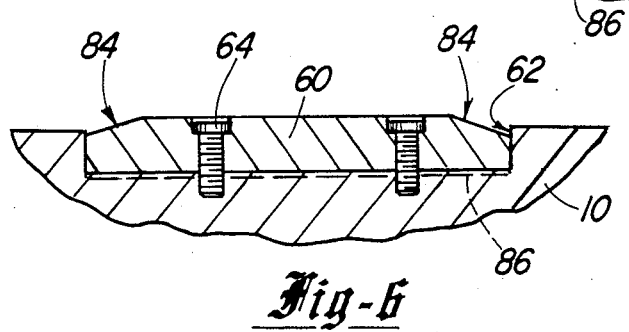
FIG. 6 is a view similar to FIG. 5 but showing one of the stationary wear pads.

As best seen in FIGS. 5–7, the pads 54–60 include straight sides which are received within corresponding, generally oblong pockets or slots 62 in bar 10. The upper surface of each of the pads 54–60 is slightly curved in a transverse direction to conform to the curvature of the bearing surface segments 82. The leading and trailing extremities 84 are slightly curved or inclined downwardly to facilitate sliding contact with the associated bearing surface segments 82. The outer edges of the extremities 84 are spaced below the bearing surface segments 82 to assure that such edges do not engage the ends of the inner races 18, 24, but rather that the ramp like extremities 84 initially engage the ends of the inner races 18, 24. Pads 54–60 are removably mounted on the bar 10 by a pair of machine screws 64 which extend through counterbored holes in each of the pads 54–60 and are threadably received within tapped holes in the bar 10. The pads 54 and 58 are radially shiftable relative to the screws 64 and thus may be displaced inwardly slightly to compress a pad or layer of resilient material 66 which is captured between the bottom of pads 54, 58 and the bottom of the slot in which the pads 54, 58 are received. The material 66 may comprise neoprene rubber, for example, which is highly resilient but yet which may be compressed slightly between the bottom of the slot 62 and the pads 54, 58. Other resilient materials capable of applying relatively uniform pressure across the bottom of the pads 54, 58 may be employed. In any event, a layer of material 66 having a thickness of 0.020 inches has been found to be suitable. A relatively thin metal shim 86 may be installed between the material 66 and the bottom of the slot. The shim 86 acts to precompress the material 66 to a preselected degree (depending on the shim's thickness), thus altering the biasing pressure which is exerted by the pads 54, 58 on the bar 10.

In operation, with the workpiece properly positioned at the machining station, the machine 12 advances the bar 10 axially toward the workpiece and through the bearing support assemblies 14, 16. The V-shaped, outer end 48 of key section 44a engages one of the beveled surface areas 34–40 and rotatably indexes the inner race 18 until the key section 44a is aligned with one of the keyways 30. As displacement of the bar 10 continues, the key sections 44 pass through the keyways 30 and the ramp-like surfaces 84 of pads 54–60 engage the bearing surface segments 82. The diameter of the bar 10 between either opposing sets of pads (54, 56 or 58, 60) is greater than that between the bearing surface segments 82. Consequently, pads 54 and 58 are radially compressed upon entry into the inner race 18 and remain so compressed until they exit from the inner race 18 whereupon they return to their original fully displaced positions. This same indexing of the inner race 24 of bearing assembly 14 and compression of pads 54, 58 occurs when the forward end of the bar 10 enters the bearing assembly 14. The inner race 18 of bearing assembly 16 remains properly rotationally indexed as a result of the key sections 44 having successively passed therethrough and the pads 54, 58 at the rear end of the bar are similarly compressed and received within the bearing surface segments 82 of inner race 18.

During axial displacement of the bar 10, the cutting tools 52 pass through a corresponding keyway 30 in the inner races 18, 24 by virtue of the fact that both the keyways, and the cutting tools 52/key sections 44 are oriented at 90 degree angles to each other relative to the axis of the bar 10.

With the bar 10 fully extended to its machining position, the wear pads 54, 58 are depressed slightly within the bar 10 and compress the layer of resilient material 66. With the layer of material 66 in compression, a reactive force is applied to the bar 10, which biases the bar 10 away from the direction of the cutting tools 52 and toward the opposite side of the inner races 18, 24, thus loading the pads 56, 60 into tight frictional engagement with the corresponding bearing surface segments 82. Accordingly, no clearance exists between the pads 54–60 and the bearing surface segments 82, and these areas of interengagement form the sole points of support of the bar 10 within the bearing assemblies 14, 16.

At this point, as shown in FIG. 3, the cutting tools 52 are spaced slightly from the surface of the workpiece to the machine. The bar 10 is then rotated and the workpiece is moved relative to the bar 10 in order to bring the workpiece into contact with the cutting tools 52 to effect machining of the workpiece. After the machining operation is complete, the workpiece is moved into clearing relationship to the cutting tools 52 and rotation of the bar 10 is terminated, following which the bar is axially returned to its standby position so as to allow the workpiece to be transferred to the next machining operation.

As the bar 10 repeatedly slides in and out of the inner races 18, 24, the pads 54–60 may wear to some extent, but remain in tight engagement with the bearing surface segments 82 of inner races 18, 24 by virtue of the constant lateral biasing force generated by the resilient material 66. It may thus be appreciated that the constant biasing action of the resilient material 66 prevents tool chatter while at the same time preventing error in the machine tool cuts brought about by excessive clearance between the bar 10 and the inner races 18, 24.

Wear on the pads 54–60 and inner races 18, 24 is further reduced by the wiping action of the pads 54–60; as the pads 54–60 enter the inner races 18, 24, their tight engagement with the bearing surface segments 82 displaces any chips or shavings of machined material which might otherwise become trapped between these bearing surfaces; trapped shavings and chips would score the bearing surfaces thus contributing to wear and machining error.

The metal shim 86 may be employed in particular applications where the inner races 18, 24 of the bearings are oversized or worn. Shims 86 increase the effective diameter of that portion of the bar 10 which bears against and is supported within the inner races 18, 24.

The wear pads 54-60 may be advantageously employed without the use of the layer of resilient material 66 which provides the lateral biasing force discussed above. In lieu of the automatic adjustment provided by the resilient material 66, metal shims 86 may be inserted beneath each of the wear pads 54-60; the thickness of the shims 86 will be such to result in an effective diameter (measured between opposing sets of the pads 54-60) which is essentially the same as or marginally less than that of the inner races 18, 24, as measured between opposing sets of the bearing surface segments 82. In this case, as the pads 54-60 and surface segments 82 become worn by use, thicker shims 86 may be installed to take up the clearance which is created by wear, thus restoring original machining accuracy.

Shims 86 may also be installed between the bar and the wear pads 56-60 in order to assure that the longitudinal axis of the bar 10 remains substantially centered within the inner races 18, 24.

As indicated previously, when the pads 54-60 become significantly worn, they may be replaced by removing machine screws 64 and installing fresh pads; shims 86 may be installed as required to compensate for any wear in the bearing surface segments 82 which would otherwise offset the central axis of the bar 10.

Attention is now directed to FIG. 8 wherein an alternate form of the wear pad construction is depicted. A wear pad 68 is provided with a pair of reduced height shoulders 70 on opposite ends thereof and has a length less than that of a slot 72 in which it is received within the bar 10. A layer 74 of resilient, compressible material, such as neoprene rubber is sandwiched between the bottom of the pad 68 and the bottom of slot 72. The pad 68 is mounted for radially displacement within slot 72 by means of a pair of locking elements 76 which are L-shaped in cross section and are received within slot 72 between the end of the pads 68 and the walls of the slot 72. Screws 78 hold the locking members 76 in place within the slots 72. Locking members 76 include a locking arm 80 which overlies and is adapted to abut the upper surface of the shoulders 70 of pad 68.

A bearing surface segment 82 displaces the pad 74 downwardly within the slot 72, thereby compressing the layer of resilient material 74 in a manner similar to that previously described. When the bar 10 is removed from the inner race, the resilient force of material 74 urges the pad 68 outwardly until shoulders 70 contact arms 80. The pad 68 may be easily replaced by removing screws 78 and withdrawing locking members 76, which in turn releases pad 68.

Reference is now made to FIG. 9 in which an alternate form of the boring bar 88 of the present invention is depicted. The bar 88 is made by machining a blank of steel which is preferably pre-heat treated soft steel such as flexor steel which possesses a Rockwell hardness number between 28 and 32. The cylindrical surface of the bar 88 is machihed away to define a continuous, longitudinally extending key 90 which, of course, is integral with the main body of the bar 88. The outer end of the key 90 includes a point 92 defining tapered surfaces which guide the key 90 into the races of a bearing assembly as discussed above. The bar 88 is otherwise essentially identical in all respects to the bar 10 previously described.

By virtue of the continuous nature of the key 90 and the fact that it forms an integral part of the body of the bar 88, the manufacturing cost of the bar is substantially reduced since the key 90 does not need to be machined in individual sections and fitted to the main body of the bar. Moreover, the key 90 eliminates the need for periodically tightening the key and potential jamming between the key and the bearing assemblies as the result of the key becoming loose from the bar.

Conventional, prior art boring bars may be adapted to employ certain advantageous aspects of the present invention by a novel method of reworking such bars. The method will now be described, with reference to FIGS. 1-7.

The key sections 44 are first removed from the bar 10, following which the entire cylindrical surface of the bar 10 is ground or otherwise machined down slightly (e.g. 0.020 inches). Grinding the bar 10 assures that its diameter will be reduced to produce the desired degree of clearance between the bar 10 and the bearing surface segments 82. The pockets or slots within which the pads 54-60 are received are then machined in the bar by any suitable means, such as electrical discharge machining. The slots having been formed in the bar 10, tapped holes are formed within the slot, extending into the bar for receiving the machine screws 64.

Next, the layer of resilient material 66 is installed within the slots associated with pads 54, 58 following which the pads 54-60 are installed in the bar 10 with machine screws 64. Screws 64 are tightened completely, so as to draw the pads 54, 58 to a position of maximum inward displacement within their corresponding slots. The bar 10 is then rotated about its axis and the upper surfaces of the pads 54-60 are machined to achieve the desired curvature thereof and a preselected diameter between the opposing sets of the pads 54-60. Following this machining operation, pads 54 and 58 are removed and the layer of resilient material 66 and optional shims 86 are installed after which pads 54, 58 are replaced and tightened to a normal operating position in which the material 66 is only slightly compressed. If desired, shims 86 may be installed beneath the pads 56, 60 at this point in order to center the longitudinal axis of the bar 10 relative to the axes of the races 18, 24.

The bar 10 having been retrofitted with the wear pads 54-60 it is then necessary to assure that the proper clearances and engagement pressures exist between the pads 54-60 and the inner races 18, 24 of a bearing assembly. This is accomplished by sliding the bar 10 into the bearing assembly 14, 16 and sensing the pressure required to effect such displacement. If the bar 10 slides too easily into the races, it is necessary to install larger shims 86 beneath two or more pairs of the pads 54-60. On the other hand, if undue pressure is required to displace the bar, the shims 86 beneath the pads 54 and 58 may be removed in order to reduce the pressure applied by pads 54-60.

With the proper sliding pressure having been achieved, several cuts may be made with the bar 10 to determine whether the path of the cutting tools 52 is accurate. At this point, any necessary changes in cutting dimensions can be effected by altering the height of the cutting tools 52 within the cartridges 50.

From the foregoing, it is apparent that the improved boring bar described above not only provides for the reliable accomplishment of the objects of the invention but does so in a particularly effective and economical manner. It is recognized, of course, that those skilled in the art may make various modifications or additions to the preferred embodiment chosen to illustrate the invention without departing from the spirit and scope of the present contribution to the art. For example, the invention may be advantageously employed with boring bars having cutting elements which are not longitudinally aligned where benefit may be obtained by applying a constant lateral biasing force of the bar in one direction within a bearing in which the bar is received.

Accordingly, it is to be understood that the protection sought and to be afforded thereby should be deemed to extend to the subject matter claimed and all equivalents thereof fairly within the scope of the invention.

I claim:

1. Improved machining apparatus of the type including the combination of a rotatable drive, a boring bar connected with said drive and including a plurality of longitudinal aligned cutting elements along one side thereof, at least one bearing journalling said bar for rotation about the longitudinal axis of said bar, said bearing having an inner race for engaging and supporting said bar, means for preventing rotation of said inner race relative to said bar, and means for longitudinally displacing said bar through said bearing, wherein the improvement comprises:

a plurality of wear pads on said bar and circumferentially spaced around the surface of said bar, said pads extending radially outward beyond the surface of said bar and into engagement with said inner race, said pads substantially forming the sole areas of support of said bar within said inner race and areas of wear on said bar resulting from longitudinal sliding engagement of said bar within said inner race; and means on said bar for biasing said bar to shift in one radial direction within said inner race toward one side of said inner race.

2. The improved machining apparatus of claim 1, wherein said pads include first and second pairs thereof, the pads in each of said first and second pair thereof being angularly spaced approximately 180 degrees from each other about the longitudinal axis of said bar.

3. The improved machining apparatus of claim 2, wherein one of the pads in each of said first and second pairs thereof is disposed within approximately 90 degrees of said cutting elements about said longitudinal axis.

4. The improved machining apparatus of claim 3, wherein said biasing means comprises a layer of resilient, compressible material between said bar and said one pad, said layer of material urging said one pad outwardly from said bar and into engagement with said inner race, whereby to eliminate clearance between said pads and said inner race, the other pad in said first and second pairs thereof being stationarily mounted on said bar.

5. The improved machining apparatus of claim 1, wherein said improvement further comprises at least one shim member interposed between one of said pads and the outer surface of said bar for altering the position of the longitudinal axis of said bar relative to the central axis of said inner race.

6. The improved machining apparatus of claim 1, wherein the improvement further comprises at least two shim members respectively interposed between two of said pads and said bar for altering the effective diameter of said bar.

7. The improved machining apparatus of claim 1, wherein each of said pads is elongate, the extremities of said pads being tapered to define a ramp surface for initially engaging the edges of said inner race upon longitudinal displacement of said bar into said bearing.

8. The improved machining apparatus of claim 1, wherein each of said pads is elongate and includes an upper surface for engaging said inner race, said upper surface possessing a curvature in a transverse direction which is generally equal to the curvature of said inner race.

9. The improved machining apparatus of claim 1, wherein said pads are elongate and the ends of said pads are spaced below the outer surface of said bar.

10. The improved machining apparatus of claim 1, wherein the improvement further includes a plurality of slots in said bar and said pads are disposed within said slots.

11. The improved machining apparatus of claim 1, wherein said means for preventing rotation of said inner race relative to said bar includes a key formed integral with said bar, said key extending continuously along a substantial length of said bar.

12. The improved machining apparatus of claim 1, wherein each of said pads is removably secured on said bar.

13. The improved machining apparatus of claim 1, including four of said pads, two of said four pads being adjacent to each other and stationarily secured to said bar, said biasing means including means for ordinarily mounting the other two of said four pads for radial movement on said bar.

14. The improved machining apparatus of claim 13, wherein said biasing means includes means between said other two pads and said bar for urging said other two pads radially away from said bar, and wherein said one radial direction is opposite to the radial direction of said cutting elements.

15. Improved machining apparatus of the type including the combination of a rotatable drive, an elongate, cylindrical bar coupled with said drive and rotatable about its longitudinal axis by said drive, means on said bar for operating on a workpiece, a bearing journalling said bar for rotation about its axis, said bearing including an inner race for slideably engaging and receiving said bar, means for preventing rotation of said bar about its axis within said inner race, and means for displacing said bar along its longitudinal axis into and out of said bearing, the improvement comprising:

means on said bar for automatically adjusting the effective diameter of said bar within said inner race to eliminate clearance between said bar and said inner race caused by war on the surfaces of said bar or said inner race, said wear resulting from sliding engagement between said bar and said inner race, said adjusting means including means for biasing said bar to shift in one radial direction toward one side of said inner race in response to said wear, said adjusting means including a plurality of pads mounted on said bar and extending radially outward beyond the circumferential surface of said bar at circumferentially spaced locations around said bar.

16. The improved machining apparatus of claim 15, wherein said improvement further comprises means for removably mounting said pads on said bar and for stationarily securing a first pair of said pads on said bar.

17. The improved machining apparatus of claim 16, wherein said mounting means include means for supporting a second pair of said pads on one side of said bar for radial movement between said bar and said inner race, and said biasing means is disposed between said second pair of said pads and said bar.

18. The improved machining apparatus of claim 17, wherein said biasing means includes a layer of resilient, compressible material interposed between said second pair of pads and said bar.

19. The improved machining apparatus of claim 18, wherein the pads in said first pair thereof are disposed on one circumferential half of said bar and the pads in said second pair thereof are disposed on the other circumferential half of said bar, said means on said bar for operating on said workpiece being wholly disposed in said other circumferential half of said bar, whereby said bar is laterally biased to shfit in a direction away from said operating means.

20. Improved machining apparatus of the type including the combination of a rotatable drive, a boring bar connected with said drive and including at least one cutting element thereon, at least one bearing journalling said bar for rotation therein, said bearing having an inner race for engaging and supporting said bar, said race including a keyway therein for receiving a key and preventing rotation of said bar relative to said inner race, and means for axially displacing said bar through said bearing, wherein the improvement comprises:
a continuous, solid key formed integral with said bar and extending substantially the entire length of said bar, said key being defined on the outer surface of said bar and receivable within said keyway in said inner race.

21. The improved machining apparatus of claim 20, wherein the improvement further comprises a plurality of pads spaced around the circumference of said bar, said pads forming substantially the sole areas of support between said bar and said inner race, said pads including a first pair of pads stationarily received on one circumferential half of said bar and a second pair of pads mounted on the other cicumferential half of said bar for radial movement relative to said bar, and means for biasing said second pair of pads to move radially away from said bar and into engagement with said bar.

22. Improved apparatus for machining bearings in an engine block or the like and of the type including the combination of an elongated boring bar having a plurality of longitudinally spaced, longitudinally aligned cutting tools on one side thereof, at least one bearing for slideably receiving and rotatably supporting one end of said boring bar and means for rotating said boring bar about its longitudinal axis into and out of said bearing, the improvement comprising:
at least two circumferentially spaced pads mounted on said one side of said boring bar and at said one end of said bar, said two pads each including surface areas extending radially beyond the surface of said bar and engaging said one bearing;
means carried by said boring bar for radially biasing said one end of said boring bar to move laterally within said one bearing in a direction toward the opposite side of said boring bar; and
at least a third pad stationarily mounted on said opposite side of said boring bar and at said one end of said boring bar, said third pad including surface areas extending radially beyond the surface of said bar and engaging said one bearing;
said first, second and third pads being substantially the sole points of support between said one end of said boring bar and said one bearing, said pads slideably engaging said one bearing upon displacement of said boring bar into and out of said one bearing and defining substantially the sole points of wear on said bar resulting from sliding engagement between said bar and said bearing.

23. The improvement of claim 22, wherein said two pads are disposed on opposite sides of a reference point on the circumferential surface of said bar, said cutting tools each extending radially outward from the circumferential surface of said bar along a longitudinal axis passing through said reference point.

24. The improvement of claim 23, wherein said two pads are circumferentially spaced apart from each other approximately 90 degrees relative to the longitudinal axis of said bar.

25. The improvement of claim 23, including a fourth pad mounted on said opposite side of said bar and at one end of said bar, said fourth pad including surface areas extending radially beyond the surface of said bar and engaging said one bearing, said third and fourth pads being respectively opposite said two pads and arranged to prevent radial movement thereof to said bar.

26. The improvement of claim 22, including at least one screw extending through each of said two pads into said bar for removably mounting said two pads on said bar.

27. The improvement of claim 25, wherein said pads are substantially equally angularly spaced from each other.

28. The improvement of claim 22, including means for releasably mounting said two pads on said bar.

29. The improvement of claim 28, wherein said mounting means include two pairs of clamps respectively associated with said two pads, each pair of said clamps releasably clamping opposite ends of the associated pads relative to said bar.

30. The improvement of claim 29, wherein:
each of said two pads includes a shoulder at opposite ends thereof, and
each of said clamps includes a clamping arm overlying and engagable with the associated shoulder.

31. The improvement of claim 30, wherein each of said clamps is L-shaped in cross section.

32. Machining apparatus comprising:
an elongate bar adapted to be rotated about and displaced along its longitudinal axis;
a plurality of radially extending cutting elements secured to said bar, said cutting elements being longitudinally spaced and longitudinally aligned along one side of said bar;
at least one bearing for slideably receiving and rotatably supporting a portion of said bar, said bearing including a rotatable inner race;
means for preventing rotation of said bar relative to said inner race;
a plurality of bearing elements circumferentially spaced around and secured to said portion of said bar, said bearing elements extending radially outward from the surface of said bar and engaging said inner race, whereby said portion of said bar is supported by said bearing elements in said inner race; and
means for radially biasing said portion of said bar to radially shift within said bearing and in a direction opposite said cutting elements in response to wear of the interengaging surfaces of said bearing elements and said inner race.

33. The apparatus of claim 32, wherein said bearing elements include first and second elongate wear pads removably mounted on said bar on respective opposite circumferential sides of said cutting elements, and at least a third pad generally opposite said cutting elements.

34. The apparatus of claim 33, wherein said biasing means includes a layer of resilient, compressible material sandwiched between each of said first and second wear pads and said bar.

35. The apparatus of claim 34, wherein each of said first and second wear pads is mounted for radial displacement on said bar and said third pad is stationarily mounted on said bar.

36. The apparatus of claim 32, wherein said preventing means includes at least one keyway in said inner race and a key on said bar, said key being slideably receivable within said keyway and preventing relative rotation between said inner race and said bar.

37. The apparatus of claim 34, wherein said compressible material is coextensive with said first and second wear pads.

38. The apparatus of claim 37, wherein said compressible material comprises neoprene rubber.

39. Improved machining apparatus of the type including the combination of a rotatable drive, a boring bar connected with said drive and including a plurality of longitudinally aligned cutting tools along one side thereof, a longitudinal key on said bar, a pair of bearings journalling said bar for rotation about the longitudinal axis of said bar, each of said bearings having an inner race provided with a keyway therein for receiving said key therethrough and preventing rotation of said bar relative to said inner race, and means for longitudinally displacing said bar relative to said bearings, wherein the improvement comprises:
a plurality of wear pads circumferentially disposed around the surface of said bar, said pads being engagable with said inner race and supporting said bar within said race;
means for mounting certain of said wear pads on said bar for radial displacement relative to the longitudinal axis of said bar and stationarily mounting other of said wear pads on said bar; and
means for biasing only said certain wear pads radially outward away from said bar and into engagement with said inner race, the biasing of said certain wear pads loading said bar against one side of said inner race and causing said bar to shift radially within said inner race toward said one side thereof as said wear pads wear.

40. The improvement of claim 39, including a plurality of slots formed in said bar, said pads being received in said slots.

41. The improvement of claim 39, wherein said biasing means includes a layer of resilient, compressible material between said bar and said certain of said pads.

42. The improvement of claim 39, wherein said mounting means includes a pair of holes in said certain of said wear pads and a pair of screws respectively slideably received through said holes and threadably held in said bar.

43. The improvement of claim 39, wherein said plurality of wear pads includes four pads angularly spaced approximately 90 degrees from each other.

44. The improvement of claim 39, wherein said certain of said wear pads are disposed adjacent a longitudinal reference axis which extends through said cutting tools, whereby said bar is biased to shift in a direction away from said cutting tools.

45. The improvement of claim 39, wherein said mounting means includes:
a pair of clamps overlying and engagable with opposite ends of said certain of said pads, and
means for releasably mounting said clamps on said bar.

* * * * *